United States Patent [19]

Guimbretierè

[11] Patent Number: 4,473,129

[45] Date of Patent: Sep. 25, 1984

[54] HUB ASSEMBLY FOR A DRIVING WHEEL OF AN AUTOMOBILE VEHICLE

[75] Inventor: Pierre Guimbretierè, Neauphle le Chateau, France

[73] Assignee: Glaenzer Spicer, Poissy, France

[21] Appl. No.: 294,353

[22] Filed: Aug. 19, 1981

[30] Foreign Application Priority Data

Sep. 17, 1980 [FR] France ................................ 80 20003

[51] Int. Cl.³ ........................ B60K 17/32; B60B 37/10
[52] U.S. Cl. .................................... 180/254; 180/73.1;
180/259; 301/6 D; 301/109; 308/191; 464/141;
464/145; 464/906
[58] Field of Search .................. 180/70.1, 70 R, 73 R,
180/259, 254, 73 D, 258, 256, 257; 308/191, 189
R; 464/178, 145, 141, 906 R; 280/96.1, 96.3,
674, 255; 301/124 R, 125, 126, 131, 6 D, 109

[56] References Cited

U.S. PATENT DOCUMENTS

| 3,583,511 | 6/1971 | Asberg | 180/70.1 |
| 3,589,747 | 6/1971 | Asberg | 280/96.1 |
| 4,010,986 | 3/1977 | Otto | 308/189 R X |
| 4,047,770 | 9/1977 | Korenhof et al. | 308/191 |
| 4,090,751 | 5/1978 | Krude | 464/145 |
| 4,150,553 | 4/1979 | Aucktor | 180/70.1 |
| 4,252,386 | 2/1981 | Hofmann et al. | 308/189 R X |
| 4,417,643 | 11/1983 | Guimbretierè | 180/254 |

FOREIGN PATENT DOCUMENTS 2603685 8/1977 Fed. Rep. of Germany ...... 308/191

Primary Examiner—Joseph F. Peters, Jr.
Assistant Examiner—Mitchell J. Hill
Attorney, Agent, or Firm—Wenderoth, Lind & Ponack

[57] ABSTRACT

The hub assembly comprises a wheel flange, a transmission joint and a rolling bearing. The confronting radial surfaces of the flange and the inner race of the bearing are separated throughout their height by a gap and consequently do not bear against each other. The connection between these two elements is achieved by means of a circumferential weld. By means of such an arrangement, there is avoided a harmful heating of the rolling bearing and of the joint by transmission of heat from the wheel flange.

7 Claims, 4 Drawing Figures

HUB ASSEMBLY FOR A DRIVING WHEEL OF AN AUTOMOBILE VEHICLE

DESCRIPTION

BACKGROUND OF THE INVENTION

The present invention relates to wheel hub assemblies employed in vehicles having front or rear driving wheels and an independent suspension, said assemblies being of the type comprising a wheel flange, a rolling bearing including an inner race adjacent the flange and an outer race and rolling elements disposed between said races, and a transmission joint disposed radially inside the rolling bearing.

It is known that in vehicles having driving wheels including an independent suspension, the wheel hub assembly must include a wheel flange proper, a rolling bearing and a transmission joint. In order to reduce as far as possible the angle of deviation of the joint without excessively increasing the width of the vehicle, it is advantageous to arrange that the joint be disposed radially within the rolling bearing. In such an assembly, it is conventional to employ a single member which constitutes a wheel flange, the inner race of the rolling bearing and the outer element of the transmission joint. The use of such a member performing several functions has several drawbacks:

as this member is in one piece, it is made from a material which is capable of satisfying the requirements of the rolling bearing function and is therefore made from a high quality and consequently expensive material;

this main member is difficult to produce in mass production since it is heavy and has a very asymmetrical shape; moreover, it has many high precision dimensions with the result that there is a high risk of rejection; it requires machining operations such as tapping which jeopardize its reliability;

the heat which is generated by the use of brakes is transmitted to the whole of the member and in particular to the part thereof adjacent the wheel flange, constituted by the inner race of the rolling bearing and by the outer element of the transmission joint, and this disturbs the correct operation of these two components (rolling bearing and joint) and the corresponding sealing elements.

SUMMARY OF THE INVENTION

An object of the invention is to provide a wheel hub assembly which avoids in particular the various aforementioned drawbacks.

The invention consequently provides a wheel hub assembly of the aforementioned type, wherein the wheel flange and the inner race of the rolling bearing are constituted by two distinct elements and have confronting radial surfaces separated by an axial gap.

According to other features of the invention which still further reduce the flow of heat from the flange:

the axial surface of contact between the outer element of the joint and the inner race of the rolling bearing is reduced;

the section of passage of the flow of heat between the wheel flange and the element constituting the outer element of the joint is reduced.

BRIEF DESCRIPTION OF THE DRAWINGS

Various embodiments may be envisaged, a certain number of which will be described hereinafter with reference to the accompanying drawings which are given only by way of example and in which.

DETAILED DESCRIPTION OF THE INVENTION

Figure 1:
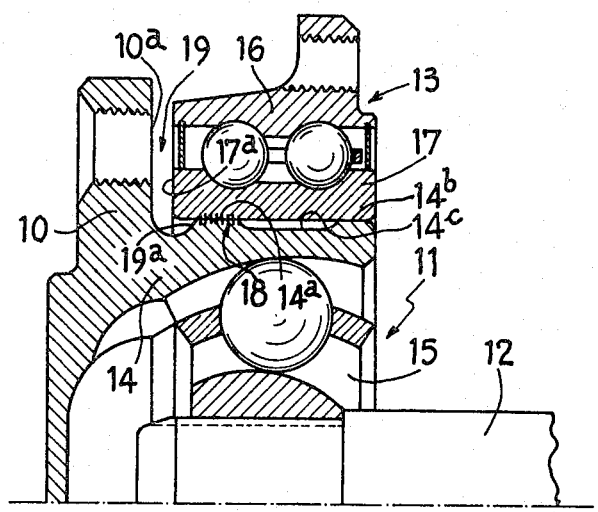
FIGS. 1 to 4 are partial axial sectional views of various embodiments of the invention.

FIG. 1 shows a wheel hub assembly for an automobile vehicle driving set of wheels including an independent suspension. This assembly mainly comprises three sub-assemblies, namely a wheel flange 10, a universal transmission joint 11 ensuring the connection at a variable angle between the wheel flange and a transmission shaft 12, and a rolling bearing 13 which supports the wheel with respect to the structure of the vehicle.

The wheel flange has a lateral axially extending extension 14 which constitutes the outer element or bell element of the transmission joint which, in the illustrated embodiment, is of the ball type, also known as a "RZEPPA joint". The inner element 15 of the joint is connected to rotate with the transmission shaft and the angular position between the inner and outer elements may vary while maintaining the homokinetic character of the transmission.

The rolling bearing comprises an outer race 16 adapted to be fixed to a hub support and an inner race 17, rolling elements being disposed in the known manner between the two races. The extension 14 is received inside the race 17 and includes two cylindrical bearing surfaces 14a, 14b which are separated by an annular space such as a groove 14c, a connection by means of a weld 18 being formed between the bearing surface 14a of the extension 14 of the flange and the inner surface of the inner race 17.

The inner race 17 of the bearing and the wheel flange have adjacent ends defined by confronting radial surfaces 10a, 17a which are axially separated by an annular empty space 19 so that in fact the flange 10 and the bearing 13 are completely separated from each other axially of the assembly, as shown, and which are consequently not in contact with each other. Moreover, in the region of the placement of the extension 14 on the flange, there is provided a recess 19a which prolongs the space 19 and partly extends along and under the inner surface of the inner race 17.

Figure 2:
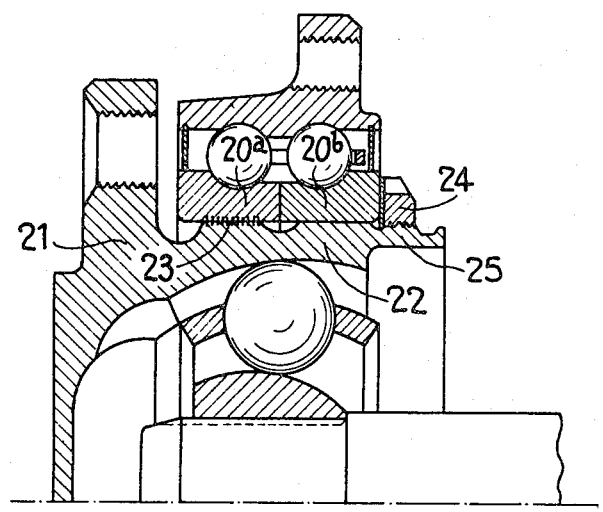

As concerns the embodiment shown in FIG. 2, only the differences in respect of the embodiment of FIG. 1 will be described, the annular empty space and recess 19a also being provided as shown. In this modification, the inner race 20 of the rolling bearing is here made in two juxtaposed parts 20a, 20b. This composite inner race and the element defining the flange 21 and the outer or bell element 22 of the transmission joint are here assembled by means of, on one hand, a circumferential cylindrical weld 23 for the part or semi-race 20a and, on the other hand, a nut 24 which cooperates with a screwthreaded portion 25 of the bell element 22 in respect of the part or semi-race 20b.

Figure 3:
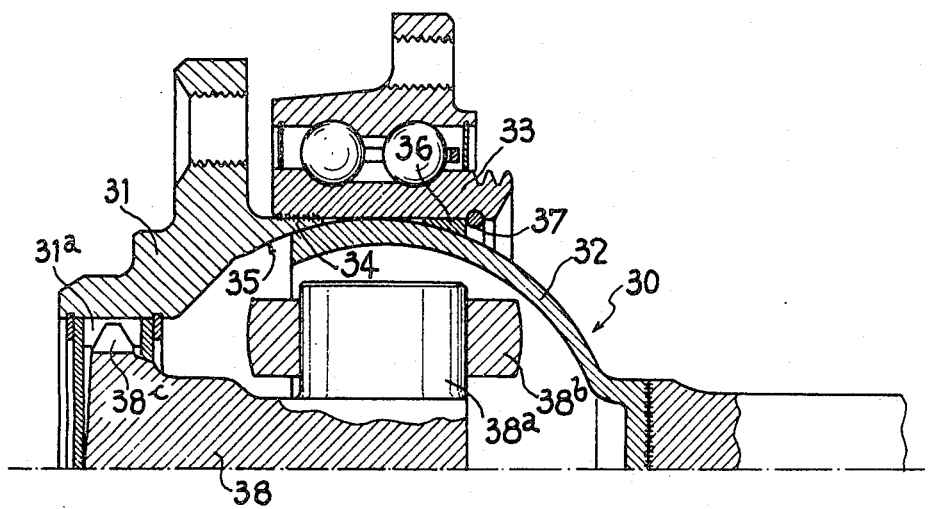

FIG. 3 shows a hub assembly according to the invention which is employed with a transmission joint 30 of the type described in French Pat. No. 79 08 263 and the certificate of addition thereto No. 79 08 301. In this arrangement, the wheel flange 31, the outer element 32 of the joint and the inner race 33 of the rolling bearing are formed by three distinct elements. The area of contact between the outer surface of the flange and the inner surface of the inner race of the bearing is limited to a cylindrical extension 34 of small longitudinal or axial dimension in the region of which the two elements are assembled by welding. The outer element 32 of the transmission joint is formed by a bowl element of part-spherical outer shape received in a bearing surface 35 of corresponding shape of the extension 34 of the flange 31 and maintained by means of an annular shim 36 and an elastically yieldable ring 37. It will be observed that the rolling bearing is completely separated from the flange axially of the assembly by an annular empty space as in the embodiment of FIG. 1.

The other or inner element of the joint is formed in the known manner by a shaft section 38 including, on one hand, a tripod element 38a supporting three rollers 38b received in tracks defined by the bowl element and, on the other hand, teeth 38c which cooperate with complementary teeth 31a provided on the wheel flange.

Figure 4:
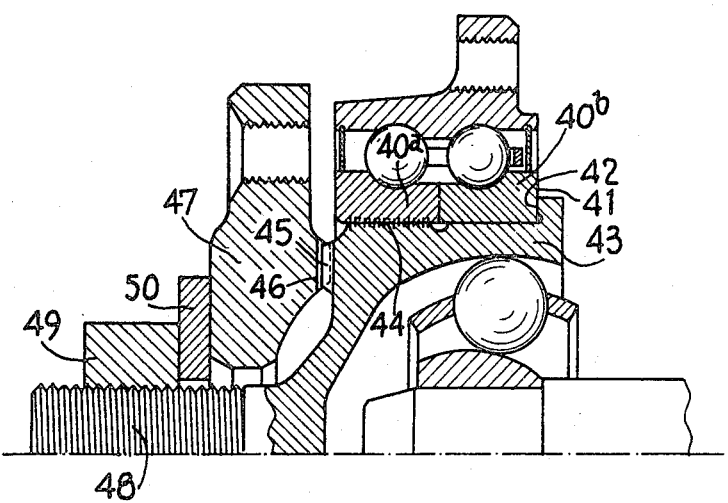

In the embodiment shown in FIG. 4, the inner race 40 of the rolling bearing is made in two parts 40a and 40b and bears, by the end surface 41 thereof, against a radial bearing surface 42 provided on the outer element 43 of the articulation joint which may be of any suitable type. This element 43 is connected by a circumferential weld 44 to the part 40a of the rolling bearing and includes front splines 45 which cooperate with complementary splines 46 provided on the wheel flange 47. The various component elements are assembled by means of a screwthreaded axial spigot 48 which cooperates with a nut 49 and a washer 50. It will be observed that the rolling bearing is completely separated from the flange axially of the assembly by an annular empty space as in the embodiment of FIG. 1.

In the various illustrated embodiments, an essential feature resides in the fact that the usual abutment between the radially extending surface of the wheel flange and the adjacent inner race of the rolling bearing does not exist and is replaced, as concerns its function, by a circumferential connection along the inner surface of the inner race. This connection, which is preferably achieved by welding, may moreover be continuous or discontinuous or be of any other suitable form.

This arrangement very substantially limits the transmission of the heat between the wheel flange and the adjacent race of the rolling bearing.

An arrangement such as that just described in various variants affords, moreover, many advantages over the prior art. Indeed:

the nature of the materials employed may correspond, for each of the component parts, to the requirements of each of the functions fulfilled, which permits using for some of these parts lower quality, and consequently cheaper, materials;

the component parts may be produced with normal production means without giving rise to special technical problems;

as indicated before, the heat flux between the various component parts is better controlled;

if the rolling bearing has a single inner race, it may however be symetrically pre-assembled and may consequently have larger dimensions;

if the rolling bearing has two inner races, its dimensioning and production are still further facilitated.

Note moreover that all these advantages are not obtained to the detriment of other features, which still further increases the interest of this invention.

Having now described my invention, what I claim as new and desire to secure by Letters Patent is:

1. In a wheel hub assembly of the type comprising in coaxial relation about a longitudinal axis a wheel flange, a rolling bearing including an inner race adjacent said flange, an outer race radially outwardly of said inner race and rolling elements disposed between said inner and outer races, and a universal joint disposed radially within said inner race, with said joint and said bearing substantially in a common radial plane, the improvement wherein:

said flange and said inner race are constituted by two distinct and separate elements;

said flange and said inner race are completely separated from each other axially of the assembly by an annular space and have confronting end surfaces axially separated from each other by said annular space; and further comprising means for connecting the axial position of said inner race relative to said flange without axial abutment or connection between said confronting end surfaces thereof.

2. The improvement claimed in claim 1, wherein said wheel flange includes an integral extension positioned coaxially within said inner race, said extension having an outer surface in contact with an inner surface of said inner race, and said connecting means comprises an axially extending weld between said outer and inner surfaces.

3. The improvement claimed in claim 2, wherein said connecting means further comprises a screwthreaded portion of said extension, and a nut threaded onto said screwthreaded portion toward said inner race.

4. The improvement claimed in claim 1, wherein said joint includes an outer element fixed to said inner race, and said flange is fixed to said outer element.

5. The improvement claimed in claim 4, wherein said connecting means comprises a radially extending surface of said outer element, said radially extending surface bearing against said inner race at an end thereof remote from said flange.

6. The improvement claimed in claim 1, wherein said connecting means comprises a radially extending surface of said joint, said radially extending surface bearing against said inner race at an end thereof remote from said flange.

7. The improvement claimed in claim 1, wherein said confronting end surfaces extend generally radially.

* * * * *